(12) United States Patent
Tsuji (10) Patent No.: US 12,090,770 B2
(45) Date of Patent: Sep. 17, 2024

(54) PRINTING APPARATUS

(71) Applicant: SEIKO EPSON CORPORATION, Tokyo (JP)

(72) Inventor: Ryuichi Tsuji, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 17/822,829

(22) Filed: Aug. 29, 2022

(65) Prior Publication Data

US 2023/0068509 A1   Mar. 2, 2023

(30) Foreign Application Priority Data

Aug. 31, 2021   (JP) ................................. 2021-140984

(51) Int. Cl.
*B41J 3/46* (2006.01)
*B41J 29/393* (2006.01)
*G06F 3/044* (2006.01)

(52) U.S. Cl.
CPC ............... *B41J 3/46* (2013.01); *B41J 29/393* (2013.01); *G06F 3/044* (2013.01)

(58) Field of Classification Search
CPC ............ B41J 3/46; B41J 29/393; G06F 3/044
See application file for complete search history.

(56) References Cited

FOREIGN PATENT DOCUMENTS

| JP | 2014193565 A | * | 10/2014 |
| JP | 2018099780 A | * | 6/2018 |
| JP | 2020-071281 A | | 5/2020 |

OTHER PUBLICATIONS

Machine Translation of JP 2018099780 A "Printing Device", Kurita Daisuke, Paragraphs 0023, 0040-0042 (Year: 2018).*
Machine Translation of JP 2014193565 A "Printing Device, Printing Device Control, Method, and Program", Wasaka, Shunichi, Paragraphs 0013-0017 (Year: 2014).*

* cited by examiner

*Primary Examiner* — Lisa Solomon
(74) *Attorney, Agent, or Firm* — Global IP Counselors, LLP (57) ABSTRACT

A printing apparatus has: a manipulation circuit board on which a display control circuit that controls a display is mounted, the manipulation circuit board being coupled to the display; a relay circuit board coupled to the manipulation circuit board through first wiring; a main circuit board on which a print control circuit that controls a printing mechanism is mounted, the main circuit board being coupled to the relay circuit board through second wiring; and a home switch coupled to the relay circuit board through third wiring, without any of the manipulation circuit board and main circuit board intervening between the home switch and the relay circuit board. The distance between the home switch and the manipulation circuit board is smaller than the distance between the home switch and the relay circuit board.

9 Claims, 6 Drawing Sheets

PRINTING APPARATUS

The present application is based on, and claims priority from JP Application Serial Number 2021-140984, filed Aug. 31, 2021, the disclosure of which is hereby incorporated by reference herein in its entirety.

BACKGROUND

1. Technical Field

The present disclosure relates to a printing apparatus.

2. Related Art

As disclosed in JP-A-2020-071281, a printing apparatus known in related art has: a display control circuit board that is coupled to a display and on which a display control circuit that controls the display is mounted; a main circuit board that is coupled to the display control circuit board and on which a printing control circuit that controls a printing mechanism is mounted; and a mechanical switch coupled to the display control circuit board.

In the printing apparatus disclosed in JP-A-2020-071281, the display control circuit board and mechanical switch are directly coupled to each other. Therefore, when an electrostatically charged person touches the mechanical switch, static electricity propagates to the display control circuit board. This may cause a distorted display on the display.

SUMMARY

A printing apparatus in the present disclosure has: a printing mechanism; a display; a first circuit board on which a display control circuit that controls the display is mounted, the first circuit board being coupled to the display; a second circuit board different from the first circuit board, the second circuit board being coupled to the first circuit board through first wiring; a third circuit board on which a print control circuit that controls the printing mechanism is mounted, the third circuit board being different from the first circuit board and second circuit board, the third circuit board being coupled to the second circuit board through second wiring different from the first wiring; and a mechanical switch coupled to the second circuit board through third wiring different from the first wiring and second wiring, without any of the first circuit board and third circuit board intervening between the mechanical switch and the second circuit board. The distance between the mechanical switch and the first circuit board is smaller than the distance between the mechanical switch and the second circuit board.

A printing apparatus in the present disclosure has: a printing mechanism; a display; a first circuit board on which a display control circuit that controls the display is mounted, the first circuit board being coupled to the display; a second circuit board different from the first circuit board, the second circuit board being coupled to the first circuit board through first wiring; a third circuit board on which a print control circuit that controls the printing mechanism is mounted, the third circuit board being different from the first circuit board and second circuit board, the third circuit board being coupled to the second circuit board through second wiring different from the first wiring; and a mechanical switch coupled to the second circuit board through third wiring different from the first wiring and second wiring, without any of the first circuit board and third circuit board intervening between the mechanical switch and the second circuit board. The distance between the mechanical switch and the display is smaller than the distance between the mechanical switch and the second circuit board.

DESCRIPTION OF EXEMPLARY EMBODIMENTS

A printing apparatus A in one embodiment of the present disclosure will be described. The printing apparatus A in this embodiment performs ink jet printing on roll paper or a manually fed cut sheet, according to a print job received from an external device 100 (see FIG. 6), such as a personal computer (PC), coupled to the printing apparatus A so that communication is possible. The printing apparatus A in this embodiment is assumed to be a large format printer intended to create posters or point-of-purchase (POP) displays.

Figure 1:
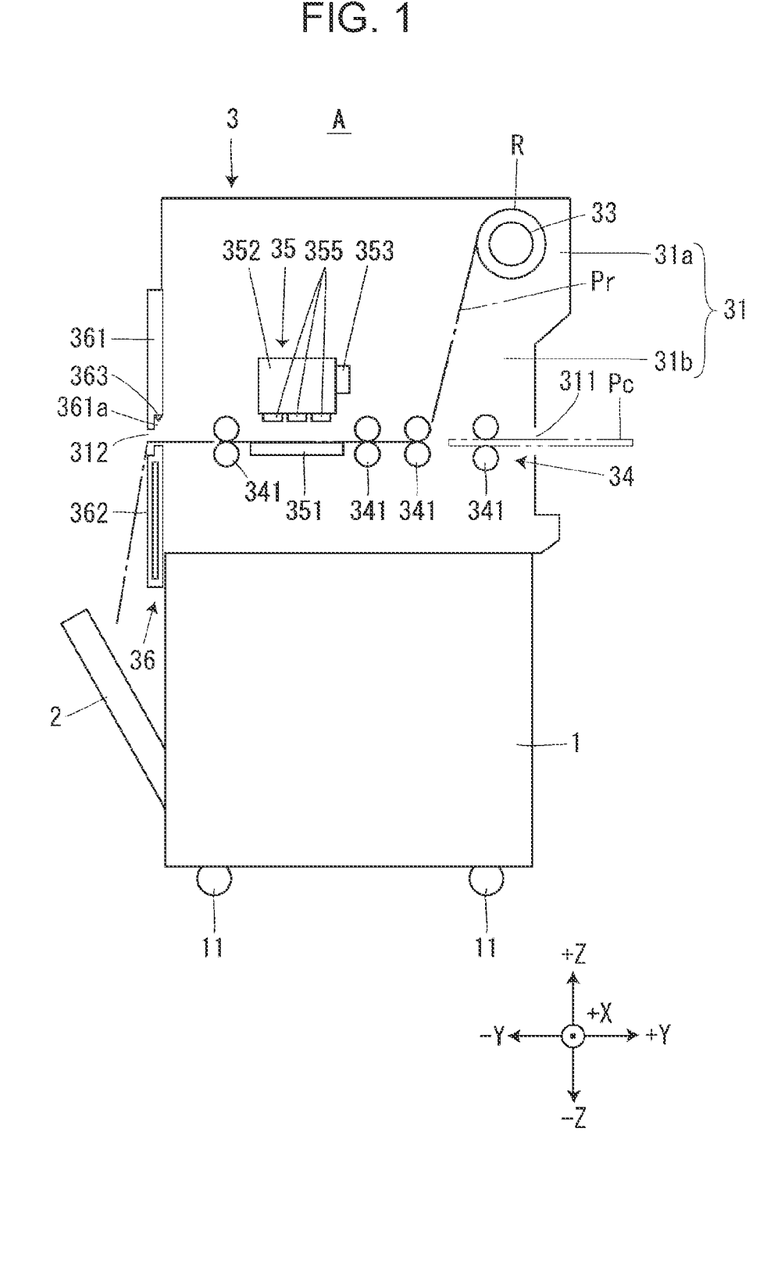
FIG. 1 schematically illustrates the structure of a printing apparatus.
Figure 2:
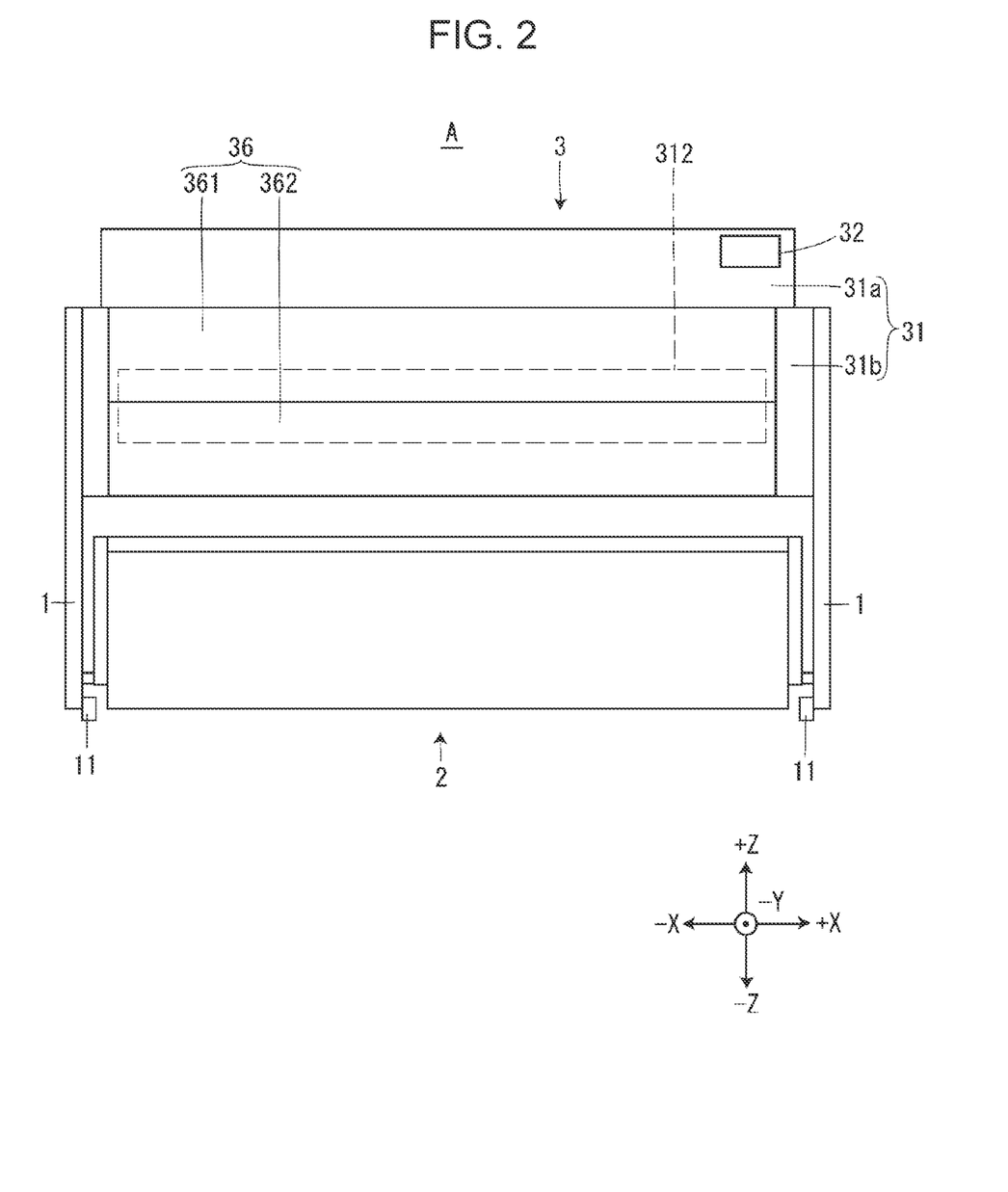
FIG. 2 illustrates the printing apparatus as viewed from the same side as an ejection slot.

FIG. 1 illustrates the printing apparatus A as viewed from the +X direction, and FIG. 2 illustrates the printing apparatus A as viewed from the −Y direction. In the drawings, XYZ coordinates are used to indicate directions. However, this is just for convenience of explanation, and does not impose any restriction on the present disclosure.

The general structure of the printing apparatus A will be described with reference to FIGS. 1 and 2. The printing apparatus A has two support legs 1, one on the right and one on the left, a stacker 2, and a body 3.

The support legs 1 support the stacker 2 and body 3. At the bottom of each support leg 1, two casters 11 are provided, one at the front and one at the back. The stacker 2 receives roll paper Pr or a cut sheet Pc ejected through an ejection slot 312 formed in the body 3.

The body 3 has a case 31, a manipulation panel 32, a roll body setting section 33, a transport mechanism 34, a printing mechanism 35, and a door 36. The case 31 includes an upper case 31a and a lower case 31b provided in the −Z direction of the upper case 31a. A manual feed slot 311 is formed in the plane of the lower case 31b in the +Y direction. The ejection slot 312 is formed in the plane of the lower case 31b in the −Y direction. Although not illustrated in FIGS. 1 and 2, the body 3 has a plurality of circuit boards B (see FIGS. 4 to 6). The plurality of circuit boards B are a manipulation circuit board B1, a relay circuit board B2, a main circuit board B3, and a child circuit board B4.

The manipulation panel 32 is disposed at the end in the +X direction and +Z direction on the plane of the upper case 31a in the −Y direction. The manipulation panel 32 functions as a user interface. The manipulation panel 32 will be described later in detail.

A roll body R, formed by winding roll paper Pr in a rolled shape, is set in the roll body setting section 33. A cut sheet Pc is manually inserted into the manual feed slot 311.

The transport mechanism 34 feeds roll paper Pr from the roll body R set in the roll body setting section 33 and transports the roll paper Pr toward the ejection slot 312. The transport mechanism 34 also transports a cut sheet Pc, manually inserted through the manual feed slot 311, toward the ejection slot 312. The transport mechanism 34 has a plurality of transport roller pairs 341 and a transport motor (not illustrated), which drives the plurality of transport roller pairs 341.

The printing mechanism 35 performs printing on roll paper Pr or a cut sheet Pc. The printing mechanism 35 has a platen 351, a carriage 352, a carriage guide 353, and a carriage motor (not illustrated). The platen 351 supports the roll paper Pr or cut sheet Pc transported by the transport mechanism 34. A plurality of print heads 355 are mounted on the carriage 352. Each print head 355 discharges ink in an ink jet method. The carriage guide 353 is disposed in the width direction of the roll paper Pr or cut sheet Pc, that is, in the X direction. The carriage guide 353 guides the movement of the carriage 352. The carriage motor drives the carriage 352. When the print head 355 discharges ink while the carriage 352 bidirectionally moves along the carriage guide 353, printing is performed on the roll paper Pr or cut sheet Pc supported by the platen 351. As described above, the printing mechanism 35 performs printing in a serial method. However, the printing mechanism 35 may performs printing in a line method. The print method in the printing mechanism 35 is not limited to an ink jet method. The print method may be, for example, an electronic photography method, a thermal method, or a dot impact method.

The door 36 openably closes the ejection slot 312. The ejection slot 312 closed by the door 36 restrains dust and other foreign matter from entering the interior of the case 31 through ejection slot 312. The door 36 has a first door member 361 and a second door member 362.

The first door member 361 closes the end of the ejection slot 312 in the +Z direction. A door recess 361*a* is formed inside the end of the first door member 361 on the same side as the second door member 362, that is, the end of the first door member 361 in the −Z direction. A cutter 363 used to cut roll paper Pr or a cut sheet Pc is provided in the door recess 361*a*. In the X direction, the door recess 361*a* and cutter 363 are longer than the maximum width of roll paper Pr or the width of the cut sheet Pc.

The second door member 362 closes the end of the ejection slot 312 in the −Z direction. When the second door member 362 moves in the −Z direction and is thereby separated from the first door member 361, the ejection slot 312 is opened. When the second door member 362 moves in the +Z direction and is thereby brought into contact with the first door member 361, the ejection slot 312 is closed.

Figure 3:
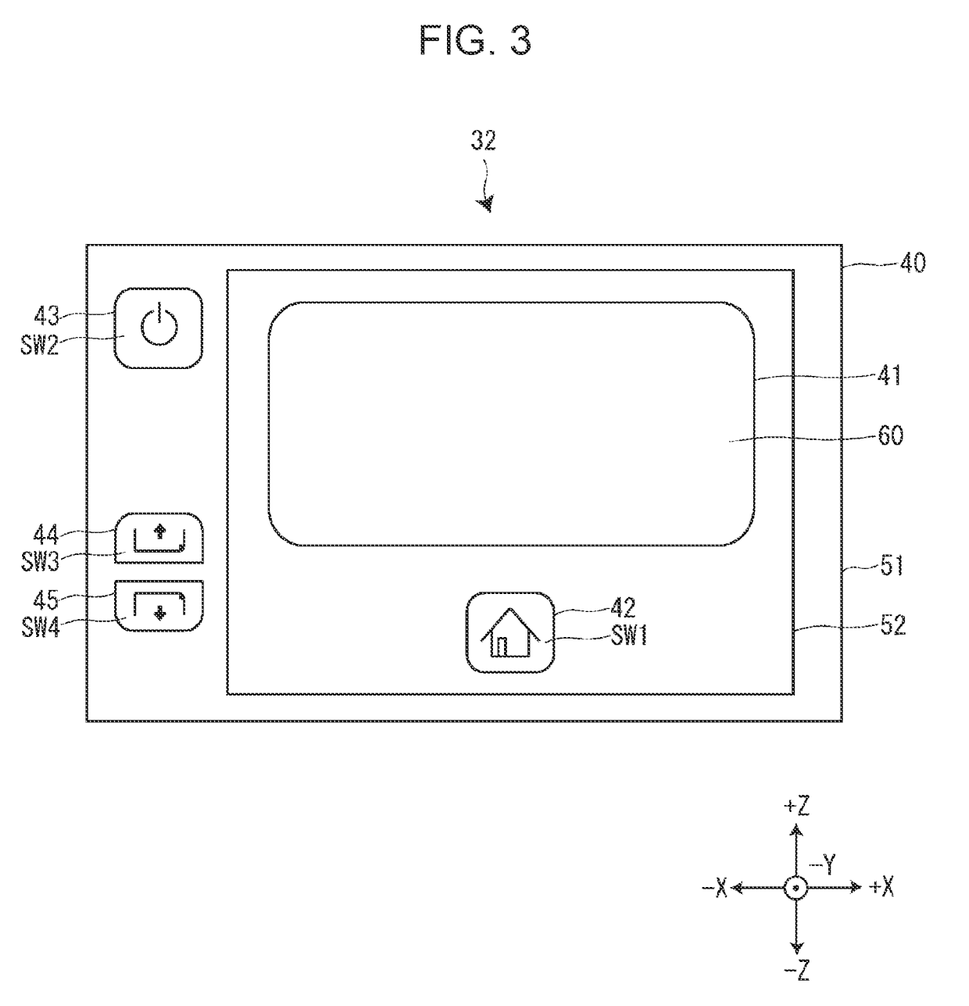
FIG. 3 illustrates the structure of a manipulation panel.

The structure of the manipulation panel 32 will be described with reference to FIG. 3. The manipulation panel 32 has a resin case 40, a touch panel-equipped display 60, and a plurality of mechanical switches SW. The plurality of mechanical switches SW are a home switch SW1, a power switch SW2, a forward feed switch SW3, and a backward feed switch SW4. Each mechanical switch SW differs from a switch on the touch panel. When a person touches the mechanical switch SW, a physical force is applied to the mechanical switch SW, closing a mechanical contact. This makes it possible for a signal to be entered.

The resin case 40 has a first plane 51 substantially perpendicular to the Y direction and a second plane 52 having a protruding shape formed by making steps extending from the first plane 51 in the +Y direction. To have the second plane 52 face in the +Z direction, the second plane 52 is formed so that the step in the −Z direction is larger than the step in the +Z direction. Thus, when the user who manipulates the printing apparatus A looks down the manipulation panel 32, the user can visually recognize the touch panel-equipped display 60 disposed on the second plane 52 with ease. The touch panel-equipped display 60 is also disposed parallel to the second plane 52.

A first hole 41 is formed in substantially a half of the second plane 52 in the +Z direction. In the second plane 52, a second hole 42, which is smaller than first hole 41, is also formed in the −Z direction of the first hole 41. The touch panel-equipped display 60 is disposed in the first hole 41. The touch panel-equipped display 60 is an example of a display. The touch panel-equipped display 60 is formed by integrating a liquid crystal display (LCD) 61 and a touch panel 62 (see FIG. 6) together. The touch panel-equipped display 60 may be formed by using an organic electroluminescence (EL) display or a resistive touch panel. The touch panel-equipped display 60, which displays various manipulation screens, is used by the user to perform various types of manipulations.

The home switch SW1 is disposed in the second hole 42. The home switch SW1 is an example of a mechanical switch coupled to a second circuit board through third wiring. The home switch SW1 is used to display a home screen on the touch panel-equipped display 60. The home screen is a first-layer screen of manipulation screens displayed on the touch panel-equipped display 60 as a hierarchy of a plurality of layers. The home screen displays, for example, information indicating whether the printing apparatus A is ready for printing or information indicating the amount of remaining ink for each color. When the home switch SW1 is pressed with a screen other than the home screen displayed on the touch panel-equipped display 60, the printing apparatus A displays the home screen on the touch panel-equipped display 60.

In the first plane 51, a third hole 43, a fourth hole 44, and a fifth hole 45 are formed at the end in the −X direction, from the +Z direction toward the −Z direction. In the third hole 43, the power switch SW2 is disposed. The power switch SW2 switches the power state of the printing apparatus A. When the power switch SW2 is pressed with the printing apparatus A powered off, the printing apparatus A turns on power to the printing apparatus A. By contrast, when the power switch SW2 is pressed with the printing apparatus A powered on, the printing apparatus A is turns off power to the printing apparatus A.

In the fourth hole 44, the forward feed switch SW3 is disposed. The forward feed switch SW3 is used to transport roll paper Pr or a cut sheet Pc in the forward direction, that is, in the −Y direction. While the forward feed switch SW3 is pressed, the printing apparatus A transports roll paper Pr or a cut sheet Pc in the −Y direction. Alternatively, the printing apparatus A may be structured so that when the forward feed switch SW3 is pressed, the printing apparatus A transports roll paper Pr or a cut sheet Pc only by a predetermined length in the −Y direction.

In the fifth hole 45, the backward feed switch SW4 is disposed. The backward feed switch SW4 is used to transport roll paper Pr or a cut sheet Pc in the backward direction, that is, in the +Y direction. While the backward feed switch SW4 is pressed, the printing apparatus A transports roll paper Pr or a cut sheet Pc in the +Y direction. Alternatively, the printing apparatus A may be structured so that when the backward feed switch SW4 is pressed, the printing apparatus A transports roll paper Pr or a cut sheet Pc only by a predetermined length in the +Y direction.

The layout of the plurality of circuit boards B that control the printing apparatus A will be described with reference to FIGS. 4 and 5. In the examples in FIGS. 4 and 5, it will be assumed that the plurality of circuit boards B are all disposed substantially perpendicular to the Y direction. The printing apparatus A has the manipulation circuit board B1, relay circuit board B2, main circuit board B3, and child circuit board B4. The manipulation circuit board B1 is an example of a first circuit board. The relay circuit board B2 is an example of a second circuit board. The main circuit board B3 is an example of a third circuit board.

The manipulation circuit board B1, relay circuit board B2, main circuit board B3, and child circuit board B4, which are mutually different circuit boards B, are coupled together through a plurality of pieces of inter-board wiring W. The plurality of pieces of inter-board wiring W are first wiring W1, second wiring W2, and third wiring W3. Each inter-board wiring W is, for example, a flexible flat cable (FFC). In FIG. 5, the plurality of pieces of inter-board wiring W and an insulative wall 65, which will be described later, are omitted. The manipulation circuit board B1, relay circuit board B2, main circuit board B3, and child circuit board B4 are each a rectangular circuit board B. In this application, the term "rectangular" does not have a restrict meaning but represents a general shape. The corners of a rectangular shape may be round. A rectangular shape may have a notch.

The manipulation circuit board B1 is a circuit board B that controls the touch panel-equipped display 60. The manipulation circuit board B1 is disposed in the vicinity of the touch panel-equipped display 60. Specifically, the manipulation circuit board B1 is disposed substantially at the same position as the touch panel-equipped display 60 in the X direction and Z direction of the upper case 31a, and is in the +Y direction of the touch panel-equipped display 60.

The relay circuit board B2 is a circuit board B coupled to the manipulation circuit board B1, main circuit board B3, and child circuit board B4. Although described later in detail, the relay circuit board B2 is a circuit board B provided to prevent the home switch SW1 mounted on the child circuit board B4 from being directly coupled to the manipulation circuit board B1. Thus, the printing apparatus A suppresses the problem that when an electrostatically charged person touches the home switch SW1, static electricity propagates to the manipulation circuit board B1 and a display control circuit 87 (see FIG. 6) and a position detection circuit 88 (see FIG. 6), which are provided on the manipulation circuit board B1, thereby malfunction.

The relay circuit board B2 is coupled to the manipulation circuit board B1 through the first wiring W1. The first wiring W1 includes a first signal line W1a (see FIG. 6) and a first power line W1b (see FIG. 6). The first signal line W1a is an example of a signal line included in first wiring.

The relay circuit board B2 is also coupled to the main circuit board B3 through the second wiring W2. The second wiring W2 includes a second signal line W2a (see FIG. 6) and a second power line W2b (see FIG. 6). The second signal line W2a is an example of a signal line included in second wiring. The second power line W2b is an example of a power line included in the second wiring.

The relay circuit board B2 is also coupled to the child circuit board B4 through the third wiring W3. The third wiring W3 includes a signal line and a power line. The relay circuit board B2 is disposed in the −X direction of the manipulation circuit board B1 and in the +X direction and +Z direction of the main circuit board B3.

The first wiring W1, second wiring W2, and third wiring W3 are mutually different wiring. In other words, each of the first wiring W1, second wiring W2, and third wiring W3 is independent wiring.

The main circuit board B3 is a circuit board B that controls the whole of the printing apparatus A. The main circuit board B3 is disposed substantially at the center of the upper case 31a in the X direction and is disposed in the −Z direction of the relay circuit board B2 in the Z direction. The distance L1 between the relay circuit board B2 and the main circuit board B3 is larger than the distance L2 between the relay circuit board B2 and the manipulation circuit board B1, as illustrated in FIG. 5.

The distance between circuit boards B refers to the distance between the nearest points. In FIGS. 4 and 5, for example, the distance L1 between the relay circuit board B2 and the main circuit board B3 is the distance between the edge of the relay circuit board B2 in the −X direction and the edge of the main circuit board B3 in the +X direction.

The child circuit board B4 is a circuit board B on which the home switch SW1 is mounted. The child circuit board B4 is disposed in the vicinity of the manipulation circuit board B1. Specifically, the child circuit board B4 has a smaller board area than the manipulation circuit board B1 and is disposed in the −Z direction of the manipulation circuit board B1 and substantially at the center of the manipulation circuit board B1 in the X direction. The distance L3 between the child circuit board B4 and the manipulation circuit board B1 is smaller than the distance L4 between the child circuit board B4 and the relay circuit board B2, as illustrated in FIG. 5. Therefore, the distance L5 between the home switch SW1 and the manipulation circuit board B1 is smaller than the distance L6 between the home switch SW1 and the relay circuit board B2. Similarly, the distance L7 between the home switch SW1 and the touch panel-equipped display 60 is smaller than the distance L6 between the home switch SW1 and the relay circuit board B2.

The distance L5 between the home switch SW1 and the manipulation circuit board B1 refers to the distance between the center of the manipulation plane of the home switch SW1 and the point, on the manipulation circuit board B1, that is the closest to the home switch SW1. The distance L7 between the home switch SW1 and the touch panel-equipped display 60 refers to the distance between the center of the manipulation plane of the home switch SW1 and the center of the LCD 61 of the touch panel-equipped display 60.

Figure 4:
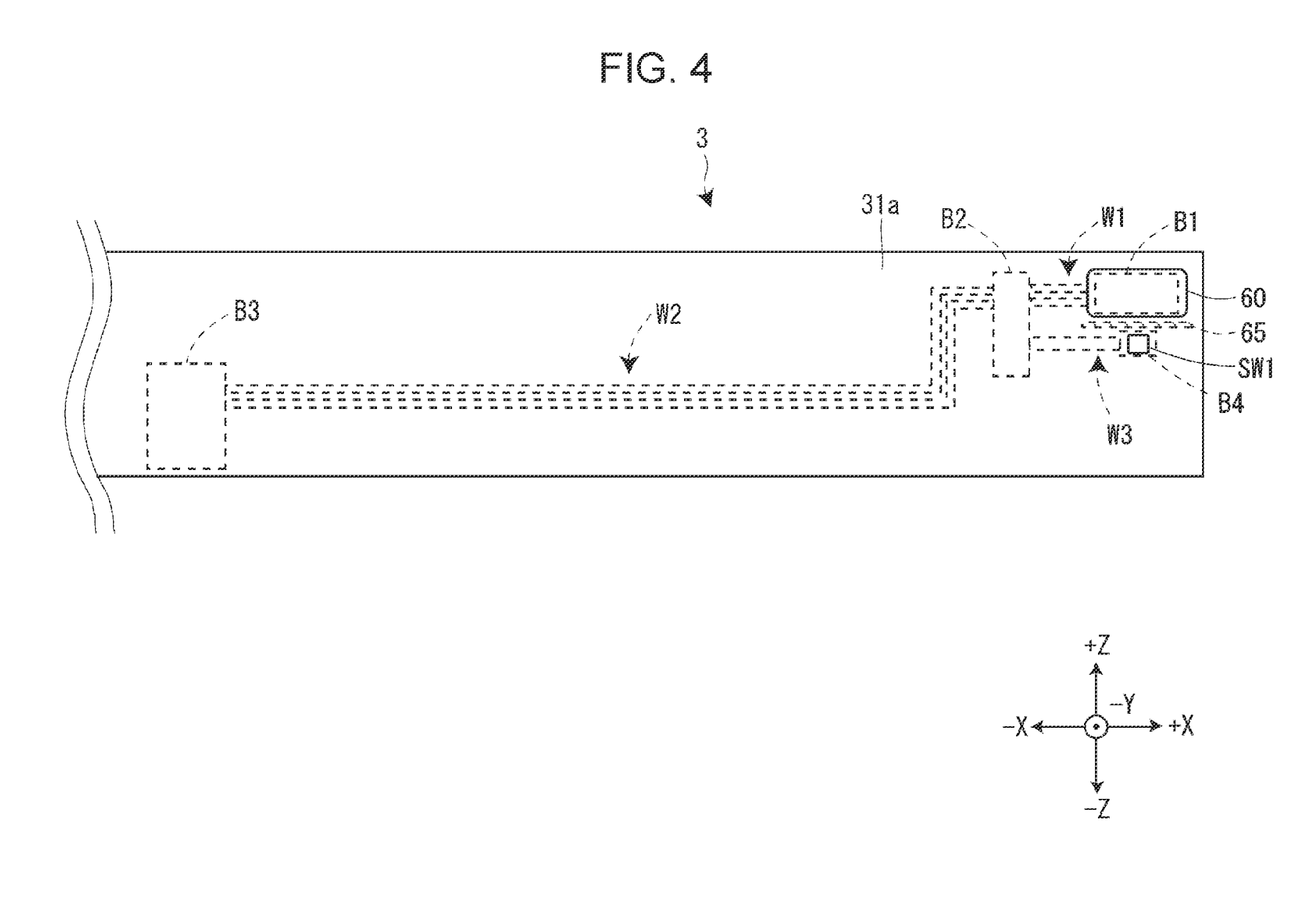
FIG. 4 illustrates the layout of circuit boards.
Figure 5:
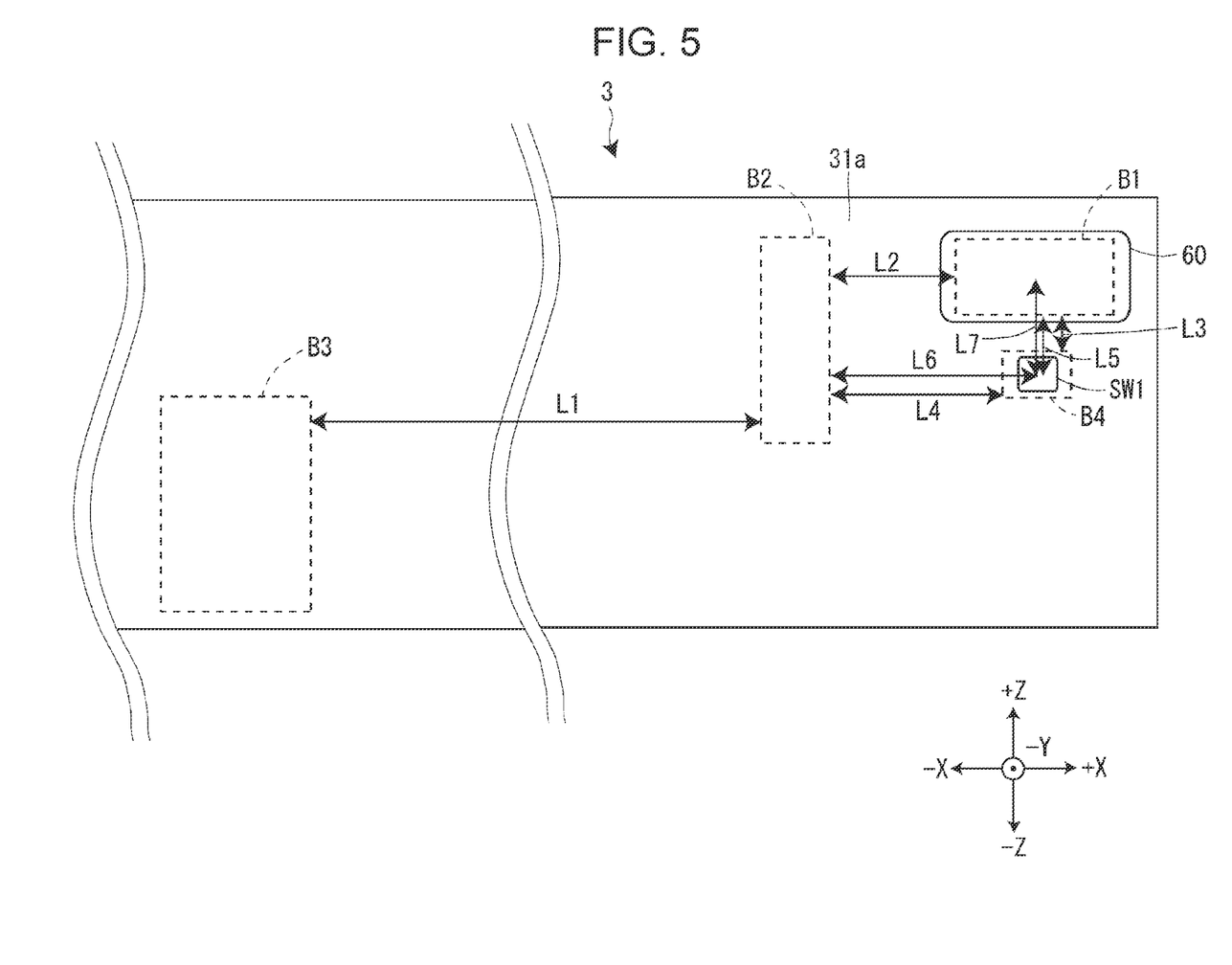
FIG. 5 is an enlarged view of part of FIG. 4.

Although, in the examples in FIGS. 4 and 5, the plurality of circuit boards B that control the printing apparatus A are all disposed substantially perpendicular to the Y direction, the circuit boards B may be disposed in any orientation. In addition, the positions of the plurality of circuit boards B may be changed in the Y direction. For example, the child circuit board B4 may be disposed between the manipulation circuit board B1 and the touch panel-equipped display 60 in the Y direction.

Figure 6:
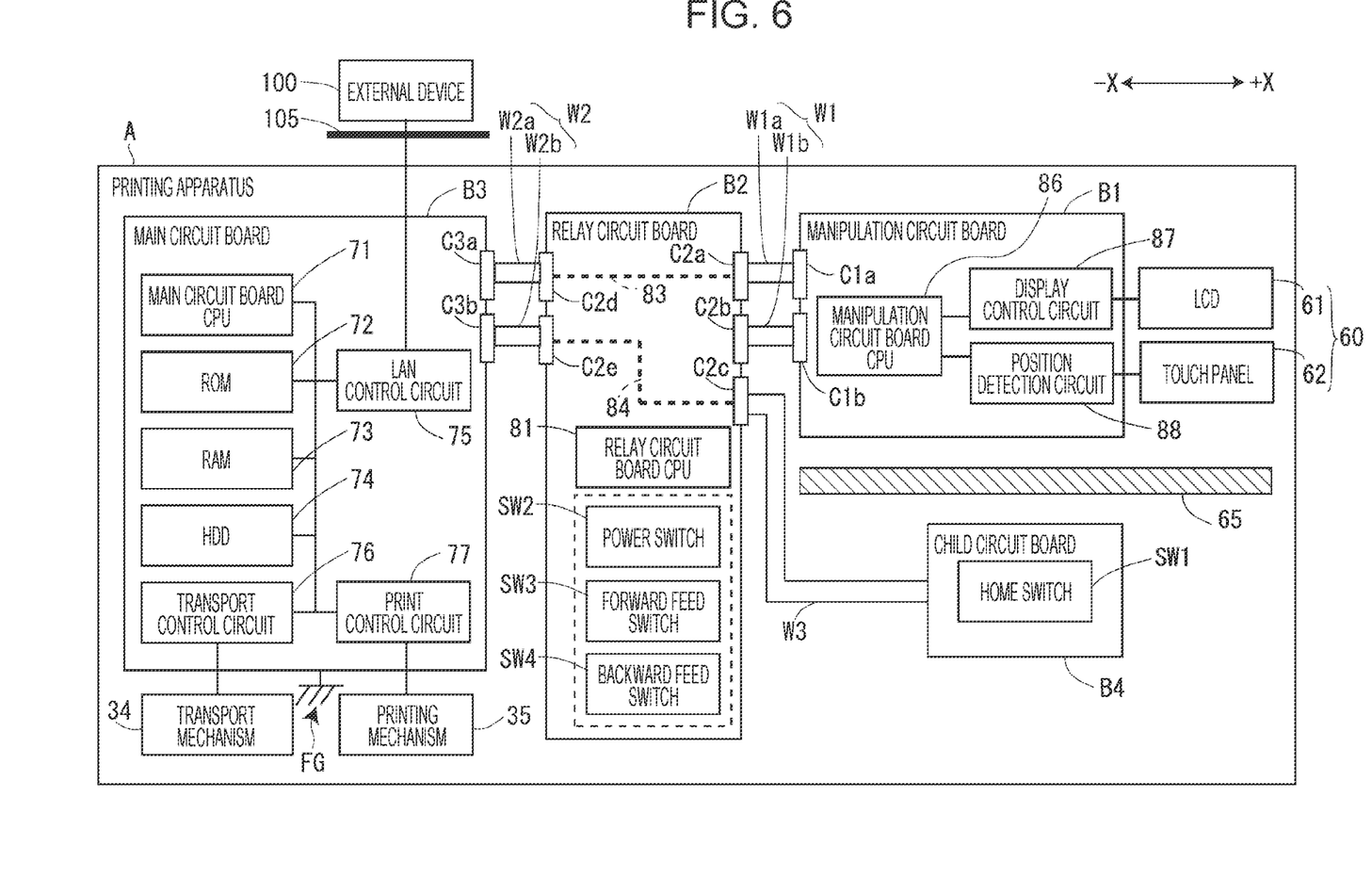
FIG. 6 illustrates the structures of the circuit boards.

The structures of the plurality of circuit boards B will be described with reference to FIG. 6. In FIG. 6, the distances among the plurality of circuit boards B and the distance between the circuit board B and the home switch SW1 are not accurate.

The main circuit board B3 has a main circuit board central processing unit (CPU) 71, a read-only memory (ROM) 72, a random-access memory (RAM) 73, a hard disk drive (HDD) 74, a local area network (LAN) control circuit 75, a transport control circuit 76, and a print control circuit 77.

The main circuit board CPU 71 receives a signal from another circuit board B and controls a portion on the main circuit board B3 accordingly. The main circuit board CPU 71 also transmits a control signal to another circuit board B. On the main circuit board B3, a hardware circuit such as an application-specific integrated circuit (ASIC) may be used as a processor, instead of using the main circuit board CPU 71. As the processor on the main circuit board B3, one or more CPUs and a hardware circuit such as an ASIC may cooperate.

The ROM 72 stores non-rewritable control programs such as firmware for the printing apparatus A. The RAM 73 is a work area used by the main circuit board CPU 71 to perform various types of control. The HDD 74 stores rewritable data such as system logs for the printing apparatus A.

The LAN control circuit 75 is coupled to the external device 100 through a LAN 105. The LAN control circuit 75 controls communication with the external device 100. For example, the LAN control circuit 75 receives a print jot from the external device 100 and transmits a response signal to the external device 100.

The transport control circuit 76 controls the transport mechanism 34. Specifically, the transport control circuit 76 has a transport motor controller that controls the transport motor included in the transport mechanism 34. The transport control circuit 76 causes roll paper Pr or a cut sheet Pc to be transported in the +Y direction or −Y direction.

The print control circuit 77 controls the printing mechanism 35. Specifically, the print control circuit 77 has a carriage motor controller that controls the carriage motor included in the printing mechanism 35, and also has a head controller that controls the print head 355. The print control circuit 77 causes a print operation to be performed to discharge ink to roll paper Pr or a cut sheet Pc.

On the main circuit board B3, a main signal connector C3$a$ and a main power connector C3$b$ are also mounted along the edge of the main circuit board B3 in the +X direction. The mounting of a connector along the edge of the main circuit board B3 in the +X direction refers to, for example, the mounting of a connector at the end of the main circuit board B3 in the +X direction.

The second signal line W2$a$ is coupled to the main signal connector C3$a$. The second power line W2$b$ is coupled to the main power connector C3$b$. The main circuit board B3 is coupled to a frame ground FG.

The relay circuit board B2 has a relay circuit board CPU 81. On the relay circuit board B2, the power switch SW2, forward feed switch SW3, and backward feed switch SW4 are mounted.

The relay circuit board CPU 81 transmits manipulation signals from the power switch SW2, forward feed switch SW3, and backward feed switch SW4 to the main circuit board B3. The relay circuit board CPU 81 also receives, from the child circuit board B4, a manipulation signal of the home switch SW1 and transmits the received signal to the manipulation circuit board B1. The relay circuit board CPU 81 may transmit the manipulation signal, received from the child circuit board B4, of the home switch SW1 to the main circuit board B3, instead of the manipulation circuit board B1. In this case, it suffices for the main circuit board B3 to transmit a display command to the manipulation circuit board B1 in response to the manipulation signal of the home switch SW1. On the relay circuit board B2, a hardware circuit such as an ASIC may be used as a processor, instead of using the relay circuit board CPU 81. As the processor on the relay circuit board B2, one or more CPUs and a hardware circuit such as an ASIC may cooperate.

On the relay circuit board B2, a first relay signal connector C2$a$, a first relay power connector C2$b$, and a relay wiring connector C2$c$ are also mounted along the edge of the relay circuit board B2 in the +X direction. The edge of the relay circuit board B2 in the +X direction is an example of the edge of the second circuit board in a first direction. The first relay signal connector C2$a$ and first relay power connector C2$b$ are each an example of a first connector. The relay wiring connector C2$c$ is an example of a third connector.

The first signal line W1$a$ is coupled to the first relay signal connector C2$a$. The first power line W1$b$ is coupled to the first relay power connector C2$b$. The third wiring W3 is coupled to the relay wiring connector C2$c$.

On the relay circuit board B2, a second relay signal connector C2$d$ and a second relay power connector C2$e$ are also mounted along the edge of the relay circuit board B2 in the −X direction. The edge of the relay circuit board B2 in the −X direction is an example of the edge of the second circuit board in a second direction. The second relay signal connector C2$d$ and second relay power connector C2$e$ are each an example of a second connector.

The second signal line W2$a$ is coupled to the second relay signal connector C2$d$. The second power line W2$b$ is coupled to the second relay power connector C2$e$.

On the relay circuit board B2, a signal wiring path 83 that couples the first signal line W1$a$ and second signal line W2$a$ together and a power wiring path 84 that couples the second power line W2$b$ and the power line included in the third wiring W3 together are also mounted. The signal wiring path 83 and power wiring path 84 are patterned on the relay circuit board B2 so that they do not intersect.

Although not illustrated in FIG. 6, wiring paths other than the signal wiring path 83 and power wiring path 84 are also mounted on the relay circuit board B2. The other wiring paths are, for example, a wiring path that couples the first power line W1$b$ and second power line W2$b$ together and wiring paths that couples the relay circuit board CPU 81 to the power switch SW2, forward feed switch SW3, and backward feed switch SW4.

The manipulation circuit board B1 has a manipulation circuit board CPU 86, the display control circuit 87, and the position detection circuit 88. The display control circuit 87 has an LCD controller to control the LCD 61. The position detection circuit 88, which has a touch panel controller, detects a position at which the touch panel 62 has been touched.

The manipulation circuit board CPU 86 issues a display command to the display control circuit 87, in response to a touch position detection signal for the touch position, detected by the position detection circuit 88, on the touch panel 62. The manipulation circuit board CPU 86 also causes the display control circuit 87 to display the home screen, in response to a manipulation signal from the home switch SW1, the signal being received from the child circuit board B4 through the relay circuit board B2. The manipulation circuit board CPU 86 also transmits a manipulation signal to the main circuit board B3, in response to a touch position detection signal for the touch position, detected by the position detection circuit 88, on the touch panel 62. On the manipulation circuit board B1, a hardware circuit such as an ASIC may be used as a processor, instead of using the manipulation circuit board CPU 86. As the processor on the manipulation circuit board B1, one or more CPUs and a hardware circuit such as an ASIC may cooperate.

On the manipulation circuit board B1, a manipulation signal connector C1$a$ and a manipulation power connector C1$b$ are also mounted along the edge of the manipulation circuit board B1 in the −X direction.

The first signal line W1$a$ is coupled to the manipulation signal connector C1$a$. The first power line W1$b$ is coupled to the manipulation power connector C1$b$.

The home switch SW1 is provided on the child circuit board B4. The phrase "provided on the child circuit board B4" refers to coupling to the child circuit board B4 without passing through the inter-board wiring W. The third wiring W3 is directly coupled to the child circuit board B4, without a connector intervening between the child circuit board B4 and the third wiring W3.

The insulative wall 65 is provided between the child circuit board B4 and the manipulation circuit board B1, that is, between the home switch SW1 and the manipulation circuit board B1. The insulative wall 65 is a partition member made of an insulative material such as a phenol resin. The insulative wall 65 is positioned between the home switch SW1 and the touch panel-equipped display 60. Since the insulative wall 65 is provided, the printing apparatus A restrains static electricity from propagating to the manipulation circuit board B1 when an electrostatically charged person touches the home switch SW1.

As described above, the printing apparatus A in this embodiment has a structure in which the distance between the manipulation circuit board B1, on which the display control circuit 87 is mounted, and the home switch SW1, which is a mechanical switch SW, is smaller than the distance between the home switch SW1 and the relay circuit board B2. In this structure, the home switch SW1 is coupled to the relay circuit board B2 but is not directly coupled to the manipulation circuit board B1. Thus, the printing apparatus A suppresses the problem that when an electrostatically charged person touches the home switch SW1, the display control circuit 87 malfunctions. In other words, even when a person touches the home switch SW1 and thereby static electricity flowing from the person is transferred to the relay circuit board B2, the printing apparatus A reduces the amount of static electricity that reaches the manipulation circuit board B1. Therefore, the printing apparatus A can restrain static electricity from affecting the display control circuit 87 and touch panel-equipped display 60 mounted on the manipulation circuit board B1. When the main circuit board B3 is coupled to the frame ground FG, most of the static electricity transferred to the relay circuit board B2 propagates to the frame ground FG through the main circuit board B3. Therefore, the printing apparatus A can further restrain static electricity from affecting the display control circuit 87 and touch panel-equipped display 60.

In the printing apparatus A in this embodiment, the distance between the home switch SW1, which is a mechanical switch SW, and the touch panel-equipped display 60 disposed in the vicinity of the manipulation circuit board B1, on which the display control circuit 87 is mounted, is smaller than the distance between the home switch SW1 and the relay circuit board B2. In this structure as well, the above effect can be obtained.

With the printing apparatus A, the signal wiring path 83 and power wiring path 84 are patterned on the relay circuit board B2 so that they do not intersect. Thus, the printing apparatus A can further suppress the effect caused on the display control circuit 87 and touch panel-equipped display 60 when static electricity flows into the signal wiring path 83.

With the printing apparatus A, the first relay signal connector C2a, first relay power connector C2b, and relay wiring connector C2c are mounted along the edge of the relay circuit board B2 in the +X direction, and the second relay signal connector C2d and second relay power connector C2e are mounted along the edge of the relay circuit board B2 in the −X direction. Therefore, the printing apparatus A can restrain the inter-board wiring W from becoming complicated as a result of the first wiring W1 and second wiring W2 intersecting or the third wiring W3 and second wiring W2 intersecting.

With the printing apparatus A, the insulative wall 65 is provided between the home switch SW1 and the manipulation circuit board B1. Therefore, the printing apparatus A can improve the effect of restraining the display on the touch panel-equipped display 60 from being distorted when an electrostatically charged person touches the home switch SW1.

With the printing apparatus A, the insulative wall 65 is provided between the home switch SW1 and the touch panel-equipped display 60. Therefore, the printing apparatus A can improve the effect of restraining the display on the touch panel-equipped display 60 from being distorted when an electrostatically charged person touches the home switch SW1.

With the printing apparatus A, the touch panel-equipped display 60 and home switch SW1 are provided in different holes in the resin case 40, which is part of the manipulation panel 32. Therefore, the printing apparatus A can improve the effect of restraining the display on the touch panel-equipped display 60 from being distorted when an electrostatically charged person touches the home switch SW1.

With the printing apparatus A, the touch panel-equipped display 60 and home switch SW1 are disposed on the same plane of the resin case 40. Therefore, the printing apparatus A can improve the maneuverability of the user.

With the printing apparatus A, the home switch SW1 is mounted on the child circuit board B4. Therefore, even when the home switch SW1 that switches the display on the touch panel-equipped display 60 is manipulated, the printing apparatus A can restrain the display on the touch panel-equipped display 60 from being distorted due to static electricity.

With the printing apparatus A, the position detection circuit 88 that detects a position at which the touch panel 62 of the touch panel-equipped display 60 has been touched is mounted on the manipulation circuit board B1. Thus, the printing apparatus A can suppress the problem that when an electrostatically charged person touches the home switch SW1, the position detection circuit 88 malfunctions.

The present disclosure is not limited to the above embodiment, but can use variations below.

Variation 1

With the printing apparatus A, a switch used to display a particular screen other than the home screen may be mounted on the child circuit board B4 as a mechanical switch SW. With the printing apparatus A, an example of this type of switch mounted on the child circuit board B4 is a switch used to display a remaining ink screen that precisely displays the amount of remaining ink for each color.

With the printing apparatus A, a switch used to switch the display on the touch panel-equipped display 60 other than a switch used to display a particular screen may be mounted on the child circuit board B4. With the printing apparatus A, examples of this type of switch mounted on the child circuit board B4 are a switch that selectively turns on and off the display on the touch panel-equipped display 60 and a switch that scrolls the screen.

With the printing apparatus A, the power switch SW2, forward feed switch SW3, or backward feed switch SW4 may be mounted on the child circuit board B4. In addition, with the printing apparatus A, a mechanical switch SW with which a person performs a manipulation on the printing apparatus A may be mounted on the child circuit board B4.

Each mechanical switch SW may be structured so that static electricity easily propagates by, for example, forming a space that is continuous from a position at which the mechanical switch SW is touched to the contact in a state in which the mechanical switch SW is touched by a person. That is, each mechanical switch SW may have a structure in which a space is formed between the mechanical switch SW and the resin case 40 and static electricity propagates from the front surface of the mechanical switch SW, which is the manipulation surface of the mechanical switch SW, to the contact on the rear surface along the mechanical switch SW. This structure increases the effect of restraining the display on the touch panel-equipped display 60 from being distorted when the mechanical switch SW is touched in the above embodiment.

Variation 2

The manipulation circuit board B1 and relay circuit board B2 of the printing apparatus A may be coupled to each other through a circuit board B other than the main circuit board B3 and child circuit board B4. Similarly, the relay circuit board B2 and main circuit board B3 may be coupled to each other through a circuit board B other than the manipulation circuit board B1 and child circuit board B4. Similarly, the relay circuit board B2 and child circuit board B4 may be coupled to each other through a circuit board B other than the manipulation circuit board B1 and main circuit board B3.

Variation 3

In the above embodiment, a large format printer has been exemplified as the printing apparatus A. However, the above embodiment may be applied to a home printer or another printer that does not perform large format printing. The above embodiment can also be applied to electronic devices in which the touch panel-equipped display 60 and mechanical switches SW are provided, besides the printing apparatus A. Examples of electronic devices include multi-function peripherals, projectors, kiosk terminals, and automatic ticket machines. In addition, modifications can be appropriately made without departing from the scope of the present disclosure.

Note

The printing apparatus will be additionally described below.

The printing apparatus A has: the printing mechanism 35; the display 60; the manipulation circuit board B1 on which the display control circuit 87 that controls the display 60 is mounted, the manipulation circuit board B1 being coupled to the display 60; the relay circuit board B2 different from the manipulation circuit board B1, the relay circuit board B2 being coupled to the manipulation circuit board B1 through the first wiring W1; the main circuit board B3 on which the print control circuit 77 that controls the printing mechanism 35 is mounted, the main circuit board B3 being different from the manipulation circuit board B1 and relay circuit board B2, the main circuit board B3 being coupled to the relay circuit board B2 through the second wiring W2 different from the first wiring W1; and the mechanical switch SW coupled to the relay circuit board B2 through the third wiring W3 different from the first wiring W1 and second wiring W2, without any of the manipulation circuit board B1 and main circuit board B3 intervening between the mechanical switch SW and the relay circuit board B2. The distance between the mechanical switch SW and the manipulation circuit board B1 is smaller than the distance between the mechanical switch SW and the relay circuit board B2.

With the printing apparatus A having this structure, when the distance between the mechanical switch SW and the manipulation circuit board B1 on which the display control circuit 87 is mounted is smaller than the distance between the mechanical switch SW and the relay circuit board B2, the mechanical switch SW is coupled to the relay circuit board B2 without being directly coupled to the manipulation circuit board B1. Thus, the printing apparatus A can suppress the problem that when an electrostatically charged person touches the mechanical switch SW, static electricity propagates to the manipulation circuit board B1 and the display on the display 60 is thereby distorted.

The printing apparatus A has: the printing mechanism 35; the display 60; the manipulation circuit board B1 on which the display control circuit 87 that controls the display 60 is mounted, the manipulation circuit board B1 being coupled to the display 60; the relay circuit board B2 different from the manipulation circuit board B1, the relay circuit board B2 being coupled to the manipulation circuit board B1 through the first wiring W1; the main circuit board B3 on which the print control circuit 77 that controls the printing mechanism 35 is mounted, the main circuit board B3 being different from the manipulation circuit board B1 and relay circuit board B2, the main circuit board B3 being coupled to the relay circuit board B2 through the second wiring W2 different from the first wiring W1; and the mechanical switch SW coupled to the relay circuit board B2 through the third wiring W3 different from the first wiring W1 and second wiring W2, without any of the manipulation circuit board B1 and main circuit board B3 intervening between the mechanical switch SW and the relay circuit board B2. The distance between the mechanical switch SW and the display 60 is smaller than the distance between the mechanical switch SW and the relay circuit board B2.

With the printing apparatus A having this structure, when the distance between the mechanical switch SW and the display 60 disposed in the vicinity of the manipulation circuit board B1 on which the display control circuit 87 is mounted is smaller than the distance between the mechanical switch SW and the relay circuit board B2, the mechanical switch SW is coupled to the relay circuit board B2 without being directly coupled to the manipulation circuit board B1. Thus, the printing apparatus A can suppress the problem that when an electrostatically charged person touches the mechanical switch SW, static electricity propagates to the manipulation circuit board B1 and the display on the display 60 is thereby distorted.

In the printing apparatus A described above, the signal wiring path 83 and power wiring path 84 are preferably provided on the relay circuit board B2, the signal wiring path 83 coupling the signal line included in the first wiring W1 and the signal line included in the second wiring W2 together, the power wiring path 84 coupling the power line included in the second wiring W2 and the power line included in the third wiring W3 together. On the relay circuit board B2, the signal wiring path 83 and power wiring path 84 do not preferably intersect.

With the printing apparatus A having this structure, there is no intersection between the wiring path that couples the signal line included in the first wiring W1 and the signal line included in the second wiring W2 and the wiring path that couples the power line included in the second wiring W2 and the power line included in the third wiring W3. Thus, the printing apparatus A can further restrains the display on the display 60 from being distorted when static electricity flows into the signal wiring path 83.

In the printing apparatus A described above, the relay circuit board B2 is preferably a rectangular circuit board B. The first relay signal connector C2a and first relay power connector C2b to which the first wiring W1 is coupled and the relay wiring connector C2c to which the third wiring W3 is coupled are preferably mounted along the edge of the relay circuit board B2 in the first direction; and the second relay signal connector C2d and second relay power connector C2e to which the second wiring W2 is coupled are preferably mounted along the edge of the relay circuit board B2 in the second direction opposite to the first direction.

In this structure, when the relay circuit board B2 is disposed between the manipulation circuit board B1 and the main circuit board B3, the printing apparatus A can restrain the inter-board wiring W from becoming complicated as a result of the first wiring W1 and second wiring W2 intersecting or the third wiring W3 and second wiring W2 intersecting.

In the printing apparatus A described above, the insulative wall 65 is preferably provided between the mechanical switch SW and the manipulation circuit board B1.

In this structure, since the insulative wall 65 is provided between the mechanical switch SW and the manipulation circuit board B1, the printing apparatus A can improve the effect of restraining the display on the display 60 from being distorted when an electrostatically charged person touches the mechanical switch SW.

In the printing apparatus A described above, the insulative wall 65 is preferably provided between the mechanical switch SW and the display 60.

In this structure, since the insulative wall 65 is provided between the mechanical switch SW and the display 60, the printing apparatus A can improve the effect of restraining the display on the display 60 from being distorted when an electrostatically charged person touches the mechanical switch SW.

The printing apparatus A described above further has the resin case 40. The resin case 40 preferably has the first hole 41 in which the display 60 is disposed and the second hole 42 in which the mechanical switch SW is disposed, the second hole 42 being different from the first hole 41.

In this structure, since the display 60 and mechanical switch SW are disposed in different holes in the resin case 40, it is possible to improve the effect of restraining the display on the display 60 from being distorted when an electrostatically charged person touches the mechanical switch SW.

In the printing apparatus A described above, the first hole 41 and second hole 42 are preferably formed in the same plane of the resin case 40.

In this structure, since the display 60 and mechanical switch SW are disposed in the same plane of the resin case 40, the printing apparatus A can improve the maneuverability of the user.

In the printing apparatus A described above, the mechanical switch SW is preferably a switch that switches the display on the display 60.

In this structure, also when a switch that switches the display on the display 60 is manipulated, the printing apparatus A can restrain the display on the display 60 from being distorted due to static electricity.

In the printing apparatus A described above, the display 60 is preferably the touch panel-equipped display 60, and the position detection circuit 88 that detects a position at which the touch panel 62 of the touch panel-equipped display 60 has been touched is preferably mounted on the manipulation circuit board B1.

In this structure, the printing apparatus A can suppress the problem that when an electrostatically charged person touches the mechanical switch SW, the position detection circuit 88 malfunctions.

What is claimed is:

1. A printing apparatus comprising:
   a printing mechanism;
   a display;
   a first circuit board on which a display control circuit that controls the display is mounted, the first circuit board being coupled to the display;
   a second circuit board different from the first circuit board, the second circuit board being coupled to the first circuit board through first wiring;
   a third circuit board on which a print control circuit that controls the printing mechanism is mounted, the third circuit board being different from the first circuit board and the second circuit board, the third circuit board being coupled to the second circuit board through second wiring different from the first wiring; and
   a mechanical switch coupled to the second circuit board through third wiring different from the first wiring and the second wiring, without any of the first circuit board and the third circuit board intervening between the mechanical switch and the second circuit board;
   wherein
   a distance between the mechanical switch and the first circuit board is smaller than a distance between the mechanical switch and the second circuit board.

2. The printing apparatus according to claim 1, wherein:
   a signal wiring path and a power wiring path are provided on the second circuit board, the signal wiring path coupling a signal line included in the first wiring and a signal line included in the second wiring together, the power wiring path coupling a power line included in the second wiring and a power line included in the third wiring together; and
   on the second circuit board, the signal wiring path and the power wiring path do not intersect.

3. The printing apparatus according to claim 1, wherein:
   the second circuit board is a rectangular circuit board; and
   a first connector to which the first wiring is coupled and a third connector to which the third wiring is coupled are mounted along an edge of the second circuit board in a first direction, and a second connector to which the second wiring is coupled is mounted along an edge of the second circuit board in a second direction opposite to the first direction.

4. The printing apparatus according to claim 1, wherein an insulative wall is provided between the mechanical switch and the first circuit board.

5. The printing apparatus according to claim 1, wherein an insulative wall is provided between the mechanical switch and the display.

6. The printing apparatus according to claim 1, further comprising a resin case, wherein
   the resin case has a first hole in which the display is disposed and a second hole in which the mechanical switch is disposed, the second hole being different from the first hole.

7. The printing apparatus according to claim 6, wherein the first hole and the second hole are formed in a single plane of the resin case.

8. The printing apparatus according to claim 1, wherein the mechanical switch is a switch that switches a display on the display.

9. The printing apparatus according to claim 1, wherein:
   the display is a touch panel-equipped display; and
   a position detection circuit that detects a position at which a touch panel of the touch panel-equipped display was touched is mounted on the first circuit board.

* * * * *